United States Patent [19]

Hwang

[11] Patent Number: 4,782,407
[45] Date of Patent: Nov. 1, 1988

[54] VIDEO CASSETTE TAPE RECORDER INCLUDING A DEVICE FOR OPENING LID OF A TAPE CASSETTE DURING THE LOADING OPERATION THEREOF

[75] Inventor: Hak S. Hwang, Seoul, D.P.R. of Korea

[73] Assignee: Gold Star Co., Ltd., Seoul, Rep. of Korea

[21] Appl. No.: 886,559

[22] Filed: Jul. 17, 1986

[30] Foreign Application Priority Data

Jul. 18, 1985 [KR] Rep. of Korea ............... 9065/1985

[51] Int. Cl.4 .............................................. G11B 5/027
[52] U.S. Cl. ........................................ 360/85; 360/93
[58] Field of Search ...................... 360/96.5, 96.6, 93, 360/95, 96.1, 83, 85

[56] References Cited

U.S. PATENT DOCUMENTS

| 4,484,240 | 11/1984 | Yoshida ............... 360/96.5 |
| 4,628,383 | 12/1986 | Miyamoto ............ 360/96.5 |

FOREIGN PATENT DOCUMENTS

| 0127953 | 8/1982 | Japan ............... 360/96.5 |
| 0112458 | 6/1984 | Japan ............... 360/96.5 |
| 0221865 | 12/1984 | Japan ............... 360/96.5 |

Primary Examiner—Robert S. Tupper
Assistant Examiner—Andrew L. Sniezek
Attorney, Agent, or Firm—Cushman, Darby & Cushman

[57] ABSTRACT

A cassette loading mechanism for a video cassette tape recorder includes a carrier for loading a tape cassette in the recorder which moves relative to a carrier guiding sidewall member by virtue of vertical and horizontal guide slots which are provided in the side wall member. An operating member is provided adjacent an inside surface of the carrier guiding sidewall member for being engaged by the carrier while it is moving horizontally on an ejecting position to an operating position. A lid opening member is attached to the operating member to engage the lid of a tape cassette placed in the carrier for opening the lid of the cassette before the cassette moves downwardly with loaded position. As a result, the length of vertical movement of the cassette during loading is reduced, which can reduce the size of the video cassette tape recorder and manufacturing costs.

1 Claim, 3 Drawing Sheets

VIDEO CASSETTE TAPE RECORDER INCLUDING A DEVICE FOR OPENING LID OF A TAPE CASSETTE DURING THE LOADING OPERATION THEREOF

BACKGROUND OF THE INVENTION

1. Field of the Invention

The present invention relates to a video cassette tape recorder, and particularly to a video cassette tape recorder including a device for opening lid of a tape cassette during the movement of the tape cassette from an ejecting position to an operating position.

2. Description of the Prior Art

In a loading operation of a typical front loading-type video cassette tape recorder, a tape cassette horizontally moves along a horizontal guide path from an ejecting position and then downwardly moves along a vertical guide path to an operating position. At the operating position, tape is drawn out of the cassette by a post of a tape-travelling system of the recorder. To this end, the post is disposed upstream, when viewed in a direction of the horizontal movement of cassette, as compared with a position of the tape when the cassette is at a position where the cassette completes its horizontal movement and initiates its vertical movement. That is the horizontal movement of the cassette particularly its preceeding lid is completed at a downstream position, when viewed in the direction of the movement of cassette, as compared with that of the post. Due to this arrangement, the bottom surface of the horizontally-moving cassette should be at a level higher than that of the tip of the post, in order to avoid any interruption of the horizontal movement of the cassette by the post. As a result, the length of the vertical movement of cassette is so long that the top surface of the cassette when it is disposed at the operating position is below the bottom surface of the cassette when it is horizontally moved. This means that if a tape cassette is inadvertently loaded in the recorder when another tape cassette has been already disposed at the operating position, it can move to a position just above the cassette tape disposed at the operating position, along the horizontal guide path, without any interruption, so that the recorder may get out of order. To prevent such risk, therefore, the recorder has to include a separate means with a complex construction for avoiding any inadvertent loading of a tape cassette when another tape cassette has been already loaded therein. This results in an increase of the manufacturing cost of the recorder. Since the length of the vertical movement of the tape cassette is long, the total height of the recorder is also proportionally long, thereby adversely affecting the compactness of the recorder.

In a tape cassette, the lower edge of tape is disposed at a higher level than that of the bottom surface of the cassette by a certain distance. If the lid of the tape cassette can be opened before the lid reaches the position just above the post during the horizontal movement of the cassette, therefore, the length of the vertical movement of the cassette can be reduced by the above-mentioned distance. This means that the top surface of the cassette when it is disposed at the operating position can be above the bottom surface of the cassette when it is horizontally moved. As a result, if a tape cassette is inadvertently loaded in the recorder when another tape cassette has been already disposed at the operating position, its horizontal movement along the horizontal guide path can be interrupted without using a separate means therefor, in view of the fact that during the horizontal movement, the front wall of the preceeding lid of cassette will contact with the rear wall of the cassette disposed at the operating position.

SUMMARY OF THE INVENTION

Therefore, an object of the present invention is to provide a video cassette tape recorder including a device for opening lid of a tape cassette during the loading operation thereof, in order to eliminate problems encountered in the above-mentioned prior art.

In accordance with the present invention, this object is accomplished by providing a video cassette tape recorder comprising a carrier for loading a tape cassette in the recorder, said carrier having a side wall provided with a guide protrusion, and a carrier-guiding side wall member having a guide slot receiving said guide protrusion, said guide slot including a horizontal guide slot portion and a vertical guide slot portion, so that the tape cassette can move horizontally from an ejecting position and then vertically move to an operating position, by said carrier being guided along said guide slot, the recorder being characterized by a device for previously opening lid of the tape cassette during the loading operation thereof, comprising: upper and lower guide slots formed on said carrier-guiding side wall member at the front of said guide slot guiding said carrier when viewed in a direction of the horizontal movement of cassette, said upper guide slot having a first upwardly-inclined slot portion, second upwardly-inclined slot portion with a less slope than that of said first slot portion, and an upwardly-extended slot portion, and said lower guide slot having a horizontal slot portion and a downwardly-extended slot portion; an operating member disposed at the inside of said carrier-guiding side wall member and provided at the rear end thereof with a downward ramp such that the downward ramp of said operating member can be contacted with the front end of the frontwardly moving carrier, said operating member having an upper protrusion engaged in said upper guide slot and an lower protrusion engaged in said lower guide slot in order to be guided by said upper and lower guide slots, so that said operating member is upwardly inclined at a slope carresponding to that of said upper guide slot as the carrier contacts with and pushes frontwardly said operating member; a lid opening member disposed at the inside of said operating member and fixedly mounted thereto so as to be upwardly inclined according to the upward inclining movement of said operating member, said lid-opening member having an upward ramp which is disposed just below the bottom of the lid of cassette when said carrier initially contacts with said operating member, so that said lid-opening member can open the lid by the upward inclining movement thereof; and a coil spring adapted to urge said operating member to be downwardly inclined, said spring having both extended ends supported respectively to said operating member and said carrier-guiding side wall member, and coils supported to said carrier-guiding side wall member.

In accordance with the above-mentioned arrangement, as the front end of the carrier contacts with and pushes the downward ramp of the operating member during the frontward horizontal movement thereof, the operating member frontwardly moves along upper and lower guide slots and upwardly inclines, so that the lid-opening member fixed to said operating member upwardly inclines to lift and open the lid of cassette. Since the lid of cassette can be opened during the horizontal movement of the cassette, it is possible to reduce the level of the horizontal movement path of the cassette, that is, the length of the vertical guide path in the recorder. Therefore, the top surface of the cassette when it is disposed at the operating position can be above the bottom surface of the cassette when it is horizontally moved. Although a tape cassette is inadvertantly loaded in the recorder when another tape cassette has been already disposed at the operating position, its horizontal movement in the recorder is effectively interrupted without using a separate means therefor. Other objects, features, and characteristics of the present invention, as well as the methods and operation and functions of the related elements of the structure, and to the combination of parts and economies of manufacturer, will become apparent upon consideration of the following description and the appended claims with reference to the accompanying drawings, all of which one apart of this specification, wherein like reference numerals designate corresponding parts in the various figures.

BRIEF DISCRIPTION OF THE DRAWINGS

Further objects and advantages of the present invention will be apparent from the following description of a preferred embodiment of the invention which is shown in the accompanying drawings, wherein:

FIG. 1 is an exploded perspective view of a recorder including a device for opening lid of a tape cassette, in accordance with the present invention;

FIGS. 2A to 2D are schematic view explaining respective operating conditions of the lid-opening device shown in FIG. 1. wherein FIG. 2A shows when a carrier for a tape cassette does not contact with the lid-opening device yet, during the horizontal movement thereof, FIG. 2B when the carrier initially contacts with the lid-opening device, during the horizontal movement thereof, FIG. 2C when the carrier completes its horizontal movement and initiates its vertical movement, and FIG. 2D when the carrier completes its vertical movement to dispose the tape cassette at the operating position;

FIG. 3 is a schematic view explaining the level of tape cassette and the level of tape with respect to a post of a tape travelling system, when the tape cassette horizontally moves along a horizontal guide path in a recorder in accordance with the present invention; and FIG. 4 is a schematic view similar to FIG. 3, explaining an example of prior art.

DETAILED DESCRIPTION OF THE PREFERRED EMBODIMENT

Figure 1:
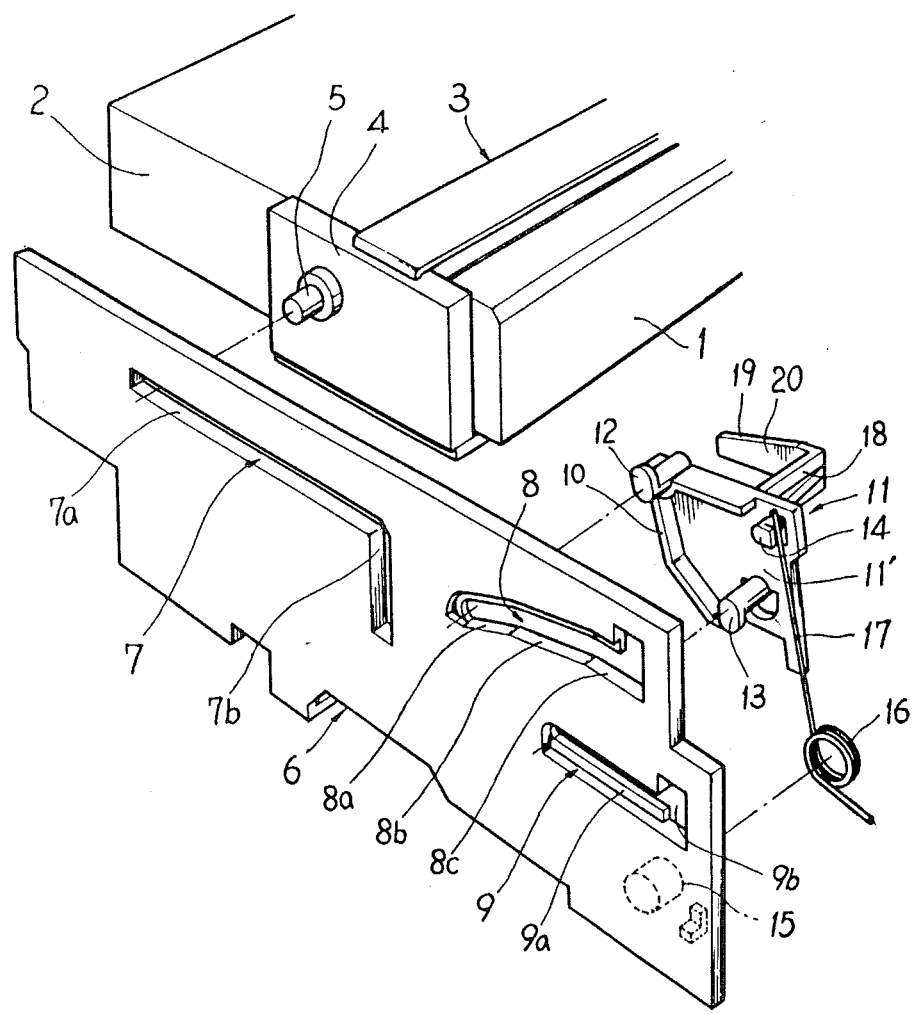

FIG. 1 shows a video cassette tape recorder including a device for opening lid of a tape cassette during the loading operation thereof, in accordance with the present invention. The recorder comprises a carrier 3 for loading a tape cassette 2 with a lid 1 in the recorder. The carrier 3 has a side wall 4 provided with a guide protrusion 5. At the outside of the carrier 3, a carrier-guiding side wall member 6 is disposed, which is fixedly mounted to a body of recorder (not shown). The carrier-guiding side wall member 6 has a guide slot 7 receiving the guide protrusion 5 of the carrier 3 and including a horizontal guide slot portion 7a and a vertical guide slot portion 7b. The carrier 3 is guided along the guide slot 7 during the loading operation so that the tape cassette 2 can move horizontally from an ejecting position and then vertically move to an operating position.

Figure 3:
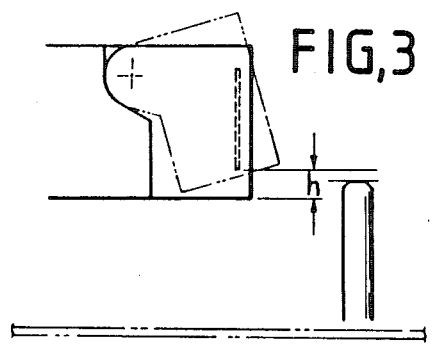
Figure 4:
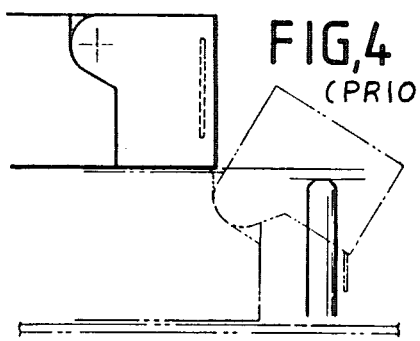

In a tape cassette, the lower edge of tape is typically disposed at a higher level than that of the bottom surface of the cassette by a certain distance h, as shown in FIG. 3. Otherwise than a prior art wherein the bottom surface of the horizontally moving cassette should be at a level higher than that of the tip of the post functioning to draw tape out of the cassette, as shown in FIG. 4, the present invention reduces the length of the vertical movement of the cassette, that is, the length of the vertical guide portion 7b, by the above-mentioned distance h so that the bottom surface of the horizontally-moving cassette is at a level lower than that of the tip of the post as shown in FIG. 3, for the purpose of interrupting inadvertant loading of a tape cassette when another cassette has been already loaded in the recorder, as described hereinbefore. However, it is necessary to previously open lid of the tape cassette during the horizontal movement of the tape cassette, in order to avoid the interruption of the horizontal movement by the post.

To this end, the recorder includes a device for opening lid of the tape cassette during the loading operation thereof in accordance with the present invention. The lid-opening device comprises upper and lower guide slots 8 and 9 formed on the carrier-guiding side wall member 6 at the front of the guide slot 7 when viewed in a direction of the horizontal movement of cassette. As shown in FIG. 1, upper guide slot 8 has a first upwardly-inclined slot portion 8a, a second upwardly-inclined slot portion 8b successive to said slot portion 8a, and an upwardly-extended slot portion 8c successive to said slot portion 8b. The second slot portion 8b has a slope less than that of the first slot portion 8a. Lower guide slot 9 has a horizontally-extended slot portion 9a and a vertically-extended slot portion 9b.

In accordance with the present invention, an operating member 11 is disposed at the inside of the carrier-guiding side wall member 6. The operating member 11 is provided at upper and lower portions of the body 11' thereof with guide protrusions 12 and 13, respectively. Guide protrusions 12 and 13 are engaged in upper and lower guide slots 8 and 9, respectively, so that the operating member 11 can be guided along the guide slots 8 and 9 and upwardly inclined at a slope corresponding to that of said upper guide slot 8. The operating member 11 also has a downward ramp 10 at the rear end thereof when viewed in a direction of the horizontal movement of cassette. The operating member 11 is arranged such that the downward ramp 10 thereof is contacted with the front end of the sidewall 4 of the frontwardly moving carrier 3. The operating member 11 is always urged to be inclined downwardly, that is, toward the carrier 3, by means of a coil spring 16. The coil spring 16 is supported at the coils thereof to a holding boss 15 fixedly mounted to the carrier-guiding side wall 6. The coil spring 16 has one end 17 supported to the operating member 11 by means of a support piece 14 protruded from the body 11' of the operating member 11. Similarly, the other end of the spring 16 is supported to the carrier-guiding side wall 6.

At the inside of the operating member 11, a lid-opening member 20 is fixedly mounted to the operating member 11, by means of a connecting piece 18 formed integrally with said lid-opening member 20. The lid-opening member 20 has at the upper portion thereof a upward ramp 19. The lid-opening member 20 is arranged such that the upward ramp 19 thereof is disposed just below the bottom of the lid 1 of the cassette 2 when the carrier 3 initially contacts with the operating member 11. As the operating member 11 is upwardly inclined along the guide slot 8 by being contacted with the forwardly moving carrier 3, the lid-opening member 20 is upwardly inclined, so that the upward ramp 19 lifts and open the lid 1 of the cassette 2.

Now, operations of the lid-opening device according to the present invention will be described in detail, with reference to FIGS. 2A to 2D.

Figure 2A:
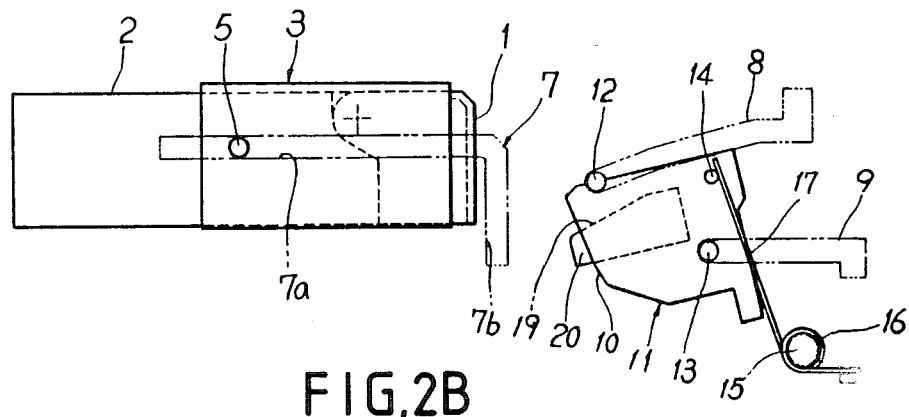
Figure 2B:
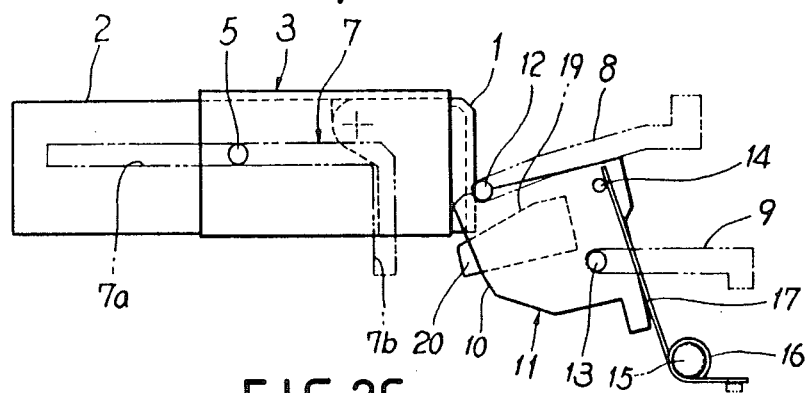

FIG. 2A shows a condition when the carrier 3 carrying the tape cassette 2 horizontally moves along the horizontal guide slot portion 7a of the guide slot 7, but does not contact with the operating member 11 yet. As the carrier 3 continuously moves horizontally along the guide slot portion 7a, the front end thereof initially contacts with the downward ramp 10 of the operating member 11, as shown in FIG. 2B. At this time, the upward ramp 19 of the lid-opening member 20 is disposed just below the bottom of the lid 1 of the cassette 2. By the continued horizontal movement, the carrier pushes the operating member 11 against the spring force of the spring 16. Accordingly, the operating member 11 frontwardly moves along upper and lower guide slots 8 and 9 and simutaneously inclines upwardly at a slope corresponding to that of the upper guide slot 8. Simultaneously, the lid-opening member upwardly inclines and lifts the lid 1 of the cassette. To prevent an interruption of the horizontal movement of the cassette by the post functioning to draw tape out of the cassette, the lid 1 of the cassette is lifted to a sufficient level before the lower end of the lid 1 passes the post when viewed in a direction of the horizontal movement of the cassette.

Figure 2C:
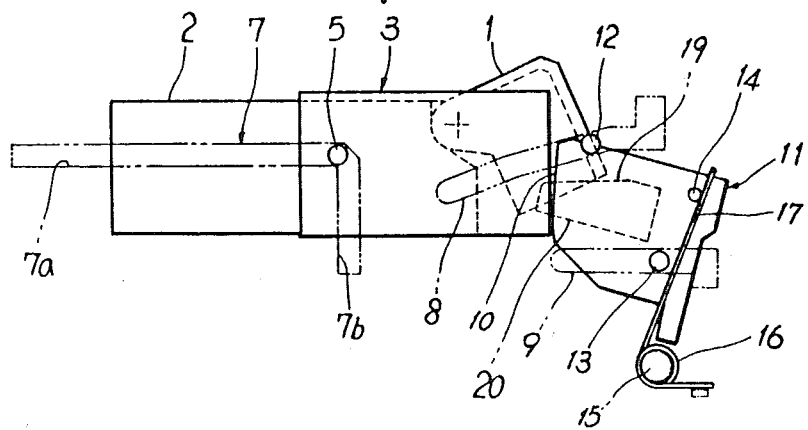

When the horizontal movement of the carrier 3 is complated as shown in FIG. 2C, the movement of the operating member 11 along the guide slots 8 and 9 and the upward inclination thereof are completed. Accordingly, the operating member is maintained under the condition shown in FIG. 2C.

As the carrier 3 downwardly moves along the vertical slot portion 7b of the guide slot 7, the lid 1 of the cassette 2 is continuously opened, in view of the fact that the lower end of the lid 1 continuously contacts with the upward ramp of the lid-opening member 20. When the downward movement of the carrier 3 is completed, as shown in FIG. 2D, the lid is fully opened so that the post of the tape-travelling system can draw tape out of the cassette without any interruption.

Figure 2D:
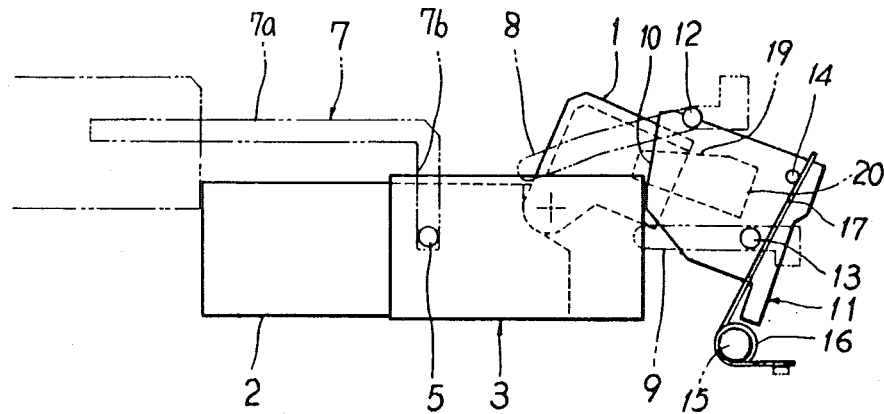

Under the condition that a tape cassette has been loaded in the recorder, as shown in FIG. 2D, the horizontal movement of another tape cassette is interrupted since the lid of the horizontally moving cassette contacts with the rear end of the cassette which is disposed at the operating position, in view of the fact that the level of the horizontal movement path of the cassette is significantly lowered in accordance with the present invention. Accordingly, it is possible to avoid a risk of the breakdown of the recorder due to the possible inadvertant loading of the tape cassette. This provides an advantage, as compared with the prior art requiring a separate means with a complex construction for avoiding any inadvertant loading of the tape cassette. Since the length of the vertical movement of the tape cassette is shortened, the compactness of the recorder is proportionally improved. While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A cassette loading mechanism for a video cassette tape recorder; comprising:
    a carrier for loading a tape cassette in the recorder, said carrier having a side wall provided with a guide protrusion;
    a carrier-guiding side wall member having a guide slot for receiving said guide protrusion, said guide slot including a horizontal guide slot portion and a vertical guide slot portion, so that a tape cassette in said carrier can move horizontally from an ejecting position and then vertically to a forward operating position, by said carrier being guided along said guide slot;
    upper and lower guide slots formed on said carrier-guiding side wall member at a forward location relative to said guide slot receiving said guide protrusion said upper guide slot having a first upwardly-inclined slot portion, a second upwardly-inclined slot portion having a lesser slope than the slope of said first slot portion, and an upwardly extending slot portion, and said lower guide slot having a horizontal slot portion and a vertically extending slot portion;
    an operating member disposed adjacent an inside surface of said carrier-guiding side wall member and provided at a rear end thereof with a downward ramp portion for contacting a front end of the forwardly moving carrier, said operating member having an upper protusion engaged in said upper guide slot and a lower protrusion engaged in said lower guide slot in order to be guided by said upper and lower guide slots, so that said operating member is upwardly inclined at a slope corresponding to the portion of said upper guide slot in which said upper protrusion is engaged when said operating member is pushed forward by movement of said carrier from said ejecting position toward said operating position;
    a lid-opening member attached to an inside portion of said operating member so as to be upwardly inclined according to the upward inclination of said operating member, said lid-opening member having an upward ramp portion which is disposed slightly beneath where the bottom of a lid of a cassette will be when said carrier initially contacts said operating member, whereby said lid-opening member may open the lid by the upward inclining movement thereof; and
    a coil spring having first and second extended end portions adapted to urge said operating member to be downwardly inclined, said spring having coils which are supported by said carrier-guiding side wall member, said first end portion bearing against said operating member, and said second end portion bearing against said carrier guiding side wall member.

* * * * *